United States Patent [19]

Hannibal et al.

[11] Patent Number: 4,569,667
[45] Date of Patent: Feb. 11, 1986

[54] FLEXIBLE COUPLING

[75] Inventors: Alan J. Hannibal; Charles H. Parr, both of Fairview, Pa.

[73] Assignee: Lord Corporation, Erie, Pa.

[21] Appl. No.: 470,732

[22] Filed: Mar. 7, 1983

Related U.S. Application Data

[62] Division of Ser. No. 181,260, Aug. 25, 1980, Pat. No. 4,391,594.

[51] Int. Cl.[4] .......................... F16D 3/02; F16D 3/56
[52] U.S. Cl. ........................................ 464/51; 464/87; 464/106
[58] Field of Search .............. 464/51, 55, 56, 80, 464/85, 87, 92, 106, 147

[56] References Cited

U.S. PATENT DOCUMENTS

| | | | |
|---|---|---|---|
| 1,107,315 | 8/1914 | Krebs | 464/80 |
| 1,414,411 | 5/1922 | Herreshoff et al. | 464/80 |
| 1,537,790 | 5/1925 | Alpe | 464/93 |
| 1,574,301 | 2/1926 | Masury | 464/93 |
| 1,605,356 | 11/1926 | Leipert | 264/277 |
| 1,636,389 | 7/1927 | Simms | 464/80 X |
| 3,977,273 | 8/1976 | Ernst et al. | 74/572 |
| 4,116,018 | 9/1978 | Weible | 464/56 |
| 4,123,949 | 11/1978 | Knight, Jr. et al. | 464/55 X |
| 4,187,699 | 2/1980 | Weible | 464/55 |

FOREIGN PATENT DOCUMENTS

| | | | |
|---|---|---|---|
| 636110 | 10/1936 | Fed. Rep. of Germany | 464/55 |
| 2530389 | 1/1977 | Fed. Rep. of Germany | 464/55 |
| 647477 | 2/1979 | U.S.S.R. | 464/80 |

Primary Examiner—Stuart S. Levy
Assistant Examiner—Daniel P. Stodola
Attorney, Agent, or Firm—Joseph H. Heard

[57] ABSTRACT

A lightweight, flexible coupling is provided by the present invention for transmitting torque and accommodating axial and angular misalignment between drive and driven shafts. The coupling includes at least one reinforcing ring disposed between a pair of hubs or plates having projecting pins to which are secured elongated filaments that are coated or impregnated with a flexible matrix. The filaments are wrapped from the hub or plate on one side of the reinforcing rings(s), to and across the reinforcing rings(s) and then to the hub or plate on the opposite side of the reinforcing ring(s) following a geodesic path. Torque applied to the coupling is thus transmitted between the hubs or plates solely through the filaments.

3 Claims, 13 Drawing Figures

U.S. Patent  Feb. 11, 1986  Sheet 1 of 4  4,569,667
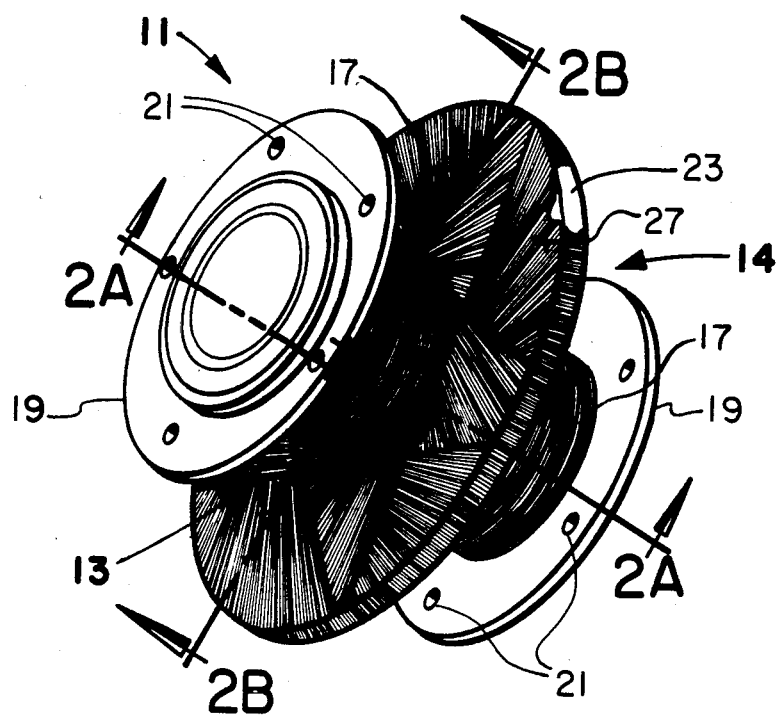
Figure 1
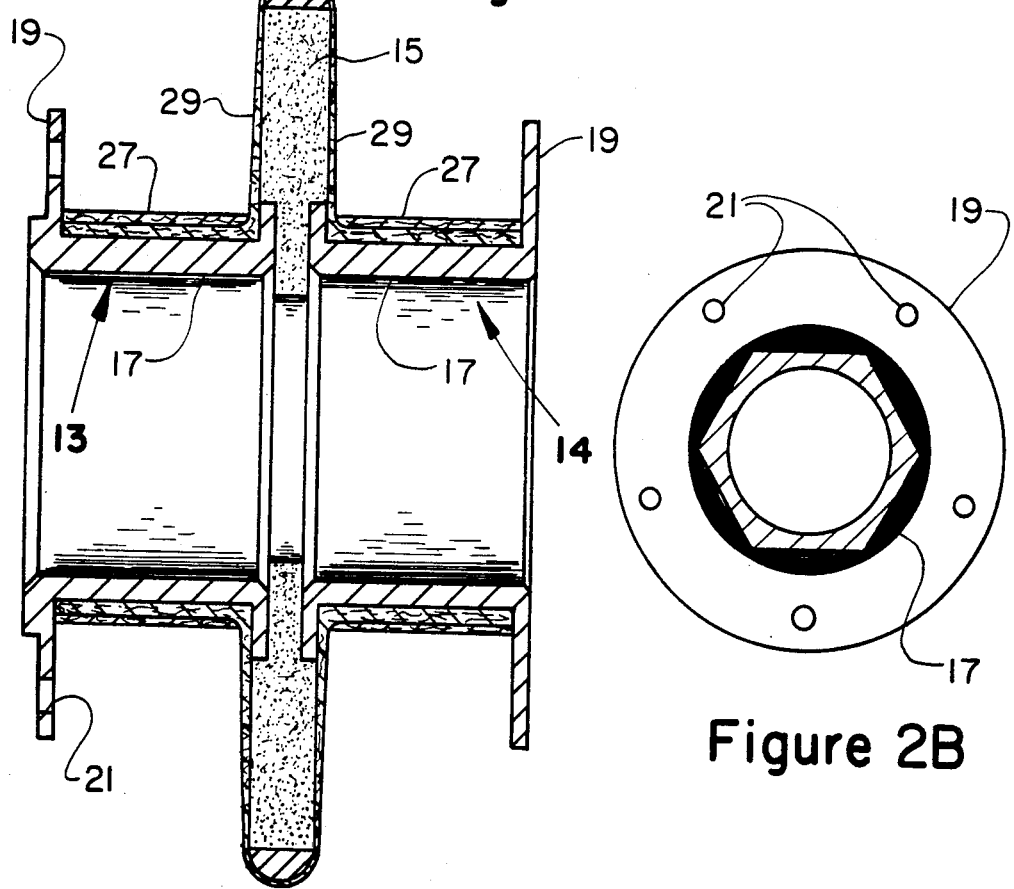
Figure 2A
Figure 2B

FLEXIBLE COUPLING

This is a division of application Ser. No. 181,260 filed Aug. 25, 1980, now U.S. Pat. No. 4,391,594.

FIELD OF THE INVENTION

This invention relates to the field of couplings, and, more specifically, to a light weight composite coupling capable of carrying high torsional loads while accommodating relatively large angular and axial misalignment between adjoining shafts.

BACKGROUND OF THE INVENTION

The basic requirements for any connection used to couple adjoining shafts include adequate torque carrying capability for the particular application and sufficient flexibility to accommodate at least limited angular and axial misalignment between the shafts to be joined. In an effort to achieve the combination of torsional stiffness and angular and axial flexibility, many early coupling designs reduced the thickness of solid metal members, bearings, gear teeth and the like to obtain greater resiliency and thus flexibility. However, high fabrication costs and the inevitable wear generated by constant rolling or sliding contact of the parts in such couplings reduce their utility and cost effectiveness. Moreover, it has been found that where sliding parts are involved, concentricity between the drive and driven shafts to be coupled is difficult to maintain due to the clearance required between the parts, which further reduces their utility in many applications.

SUMMARY OF THE INVENTION

The recent development of composites, which consist of a plurality of fiber strands impregnated or coated with a matrix material, is of particular value in the construction of universal joints, flywheels and flexible couplings. See for example U.S. Pat. Nos. 3,977,273 to Ernst et al and 4,116,018 to Weible. As disclosed herein, by eliminating the thin flexible metal members of prior art connectors and utilizing a layer or layers of composite material, a lightweight flexible connection is provided by the subject invention which is torsionally stiff and at the same time can accommodate much higher angular and axial misalignment than prior art connectors. The flexible coupling herein includes an outer reinforcing ring disposed between a pair of hubs or plates of lesser diameter, each having a central bore or a shaft extension, which are concentrically disposed on either side of the reinforcing ring. An elongated fiber strand or bundle, impregnated or coated with a flexible matrix such as natural rubber or urethane, is continuously wrapped from a point tangent to the central bore or shaft of one hub, to the outer surface of the reinforcing ring and then to a corresponding point on the other hub following a geodesic path. As described below, wrapping the continuous fiber strand or bundle in this manner will be considered for purposes of discussion as forming a plurality of individual fibers or strands. Since the only connection between the hubs is by their attachment to the fibers, torque from the driving shaft is transmitted directly through the fibers to the driven shaft, placing each fiber in tension. The flexible matrix with which the fibers are impregnated or coated enables adjacent fibers to move angularly and axially with respect to one another to accommodate angular and axial misalignment between the drivers and driving shafts. As discussed in detail below, the number and configuration of the reinforcing ring(s) may be altered to obtain desired performance, and several means may be utilized to enhance anchoring of the fibers to the hubs or plates on each side of the reinforcing ring.

Therefore it is an object of the present invention to provide a light weight flexible coupling capable of carrying high torque loads while accommodating axial and angular misalignment between adjoining shafts.

It is another object of the present invention to provide a flexible coupling including at least one reinforcing ring disposed between a pair of hubs or plates of lesser diameter which are concentric with the reinforcing ring.

It is still another object of the present invention to provide a flexible coupling having a reinforcing ring disposed in spaced relation between a pair of hubs or plates, wherein an elongated fiber strand, coated or impregnated with a flexible matrix, is wrapped from a hub or plate on one side of the reinforcing ring, to and across the reinforcing ring and then to the hub or plate on the opposite side of the reinforcing ring in a geodesic path.

It is a further object of the present invention to provide anchoring means for securing the fibers to the hub or plate on opposite sides of the reinforcing ring.

DESCRIPTION OF THE DRAWINGS

Objects in addition to the foregoing will become apparent upon consideration of the following discussion taken in conjunction with the accompanying drawings wherein:

FIG. 1 is an isometric view of one embodiment of the composite coupling of the present invention.

FIG. 2A is a cross-sectional view taken generally along line 2A—2A of FIG. 1.

FIG. 2B is a cross sectional view taken generally along line 2B—2B of FIG. 1.

DETAILED DESCRIPTION OF THE INVENTION

Figure 3:
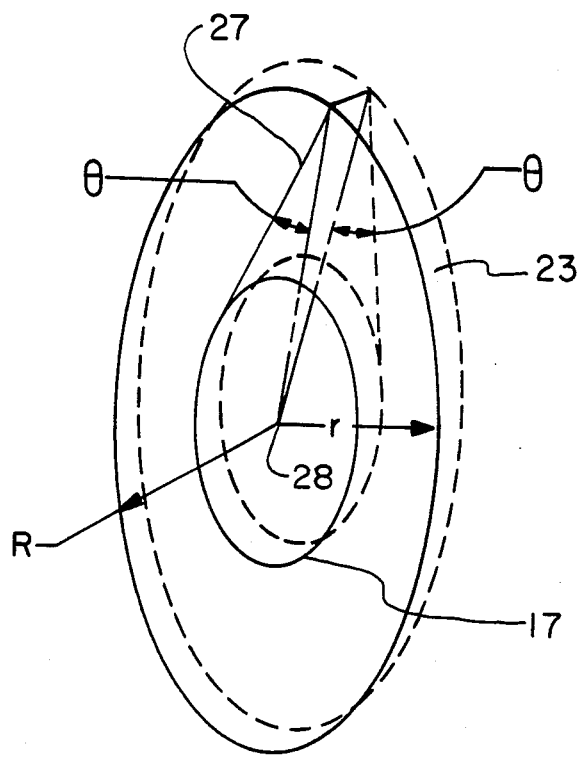
FIG. 3 is a partial isometric view of the coupling herein showing the manner of wrapping the fiber material from one side of the coupling to the other.

Referring now to the drawings and in particular to FIGS. 1, 2A and 2B, one embodiment of the composite coupling of the present invention is shown and labeled generally with the reference 11. Coupling 11 includes a pair of hubs 13 and 14 which are held in spaced relation and concentric with one another by a removable mandrel 15. Each hub 13 and 14 includes a nonaxisymmetric shaft extension 17 having a generally circular flange 19 attached at one end in which a plurality of bores 21 are drilled or machined at spaced intervals for attachment to the flange of a shaft (not shown) to be coupled. The shaft 17 of hubs 13 and 14 is preferably hexagonal in cross section as shown in FIG. 2B, but other nonaxisymmetric cross sections may be utilized for purposes to become apparent below. In addition, hubs 13 and 14 need not include a flange 19 for attachment to a drive or load shaft, if in a particular application a key or spline connection between the hubs 13 and 14 and shafts is preferred.

A reinforcing ring 23, of larger diameter than hubs 13 and 14, is disposed between the hubs 13 and 14 and held in place by the outer edge of mandrel 15. The reinforcing ring 23 and hubs 13 and 14 are preferably formed of a lightweight metal or a graphite/epoxy composite having sufficient compressive strength to resist the forces induced by the torque of the anticipated application for coupling 11. At this point, it should be noted that prior to the formation of coupling 11, discussed below, there is no direct connection between the hubs 13 and 14 either with each other or with the reinforcing ring 23 except through the mandrel 15 which is later removed. Relative movement of the hubs 13 and 14, and in turn the shafts to which they are connected, is thus completely dependent on the connecting means attaching thereto.

Referring now to FIGS. 2A and 3, the connecting means for forming coupling 11 is shown. A continuous length of high strength fiber strands or bundles such as graphite, aramid, glass or a suitable equivalent is wrapped on a substantially geodesic path from a point tangent to the shaft 17 of hub 13, to and across the outer surface of the reinforcing ring 23 and then to a corresponding point tangent to the shaft 17 of hub 14 on the opposite side of reinforcing ring 23. As shown in FIG. 3, chords drawn from the center 28 of shaft 17 to the points at which the fiber contacts the edges of reinforcing ring 23, form an angle θ with the fiber on either side of coupling 11. The following relationship applies in wrapping the continuous fiber along the geodesic or shortest path between the shafts 17 of hubs 13 and 14:

$$\sin \theta = r/R$$

Where:
r = radius of the hub shafts
R = radius from the center of the hub shafts to the reinforcing ring The significance of wrapping the fiber along the shortest or geodesic path between the shafts 17 of hubs 13 and 14, is that application of a torsional force in the clockwise direction for example will be instantaneously resisted by the tensile strength and modulus of essentially one half of the fibers. The same torque carrying capability is provided for in counterclockwise rotation of coupling 11, wherein the other half of the fibers forming coupling 11 are placed in tension. If the fiber did not follow the geodesic path, application of torque would cause a degree of slippage or straightening of the fiber since it is not mechanically attached to the reinforcing ring 23. This would result in unwanted torsional softness in coupling 11 and undesirable stresses in the composite structure. Since the only connection between hubs 13 and 4 is the fiber, all of the torque applied by the driving shaft will be transmitted directly through the fiber to the driven shaft and sufficient torsional strength must be provided to accommodate maximum torque for a given application.

In forming the completed coupling 11, the continuous length of fiber is first coated or impregnated with a flexible matrix such as natural rubber or urethane and then wrapped along the surface of mandrel 15 in a geodesic path as discussed above from hub 13 to reinforcing ring 23 and then to hub 14. For purposes of discussion, each successive wrap of the fiber will be considered as forming an individual filament 27. Once a wrapping circuit is completed, successive circuits lay down filaments 27 immediately adjacent to one another to form a partial or complete bladder or diaphragm 29 on either side of the reinforcing ring 23 which increases in thickness from the reinforcing ring 23 to the hubs 13 and 14.

In the embodiment of FIGS. 1 and 2A the shafts 17 of hubs 13 and 14 are wrapped with a plurality of filaments 27, laid down side-by-side, in each wrapping circuit. It has been found that with the application of torque to coupling 11, a means of anchoring filaments 27 must be provided to avoid slippage and unwinding. This has been a problem in many prior art designs. The subject invention provides several alternative anchoring means to avoid this limitation found in existing couplings and universal joints as discussed below, and in this embodiment the shafts 17 of hubs 13 and 14 are formed in a nonaxisymmetric configuration to assure that filaments 27 are held firmly in place. Shafts 17 may be hexagonal as shown in FIG. 2B, but various other configurations are also utilized including octagonal or elliptic shapes.

Figure 4:
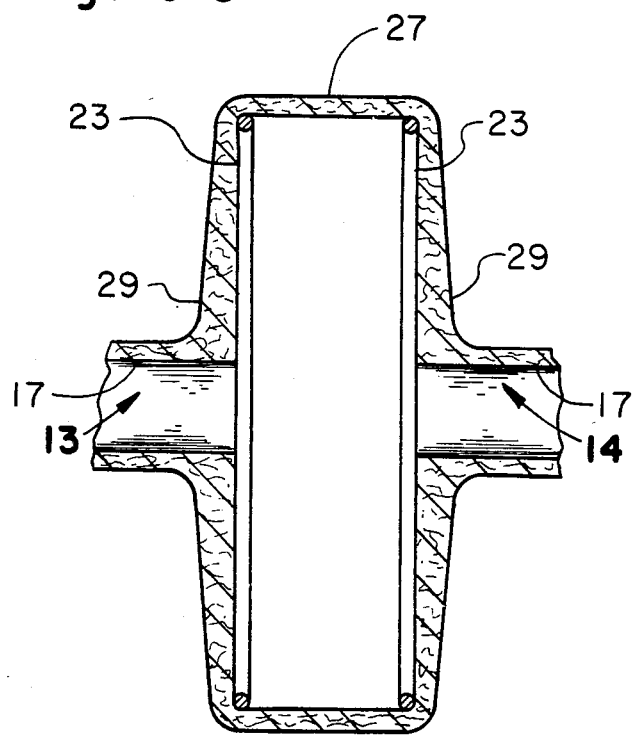
FIG. 4 is a partial cross-sectional view of an alternative embodiment of the coupling of the present invention showing plural reinforcing rings.

A single layer of filaments 27 forming the diaphragms 29, and a plurality of layers of filaments 27 wrapped one on top of the other about shafts 17, is normally sufficient to provide the requisite torque carrying capacity of coupling 11 while retaining sufficient flexibility to accommodate axial and angular misalignment between the drive and driven shafts to be connected. The number of layers of filaments 27 may be increased as desired by simply repeating the wrapping process, with the result being increased torque carrying capability but reduced flexibility of coupling 11. In addition, the filaments 27 may be overwrapped by an additional layer of filaments 27 impregnated with a rigid matrix material such as epoxy to rigidify diaphragms 29 and the filaments 27 along shaft 17. In some applications it may be desirable to impregnate filaments 27 along shaft 17 with epoxy for enhanced rigidity, while utilizing urethane or natural rubber impregnated filaments 27 for diaphragms 29 to form a two matrix system. The characteristics of coupling 11 may also be altered by providing two or more reinforcing rings 23 as shown in FIG. 4, which increases the flexibility of coupling 11 as compared to the configurations described above. Once the wrapping is completed, the matrix material is vulcanized while the coupling 11 is still on the mandrel 15. The mandrel 15 may then be removed allowing the cured diaphragms 29 to flex freely.

Figure 5:
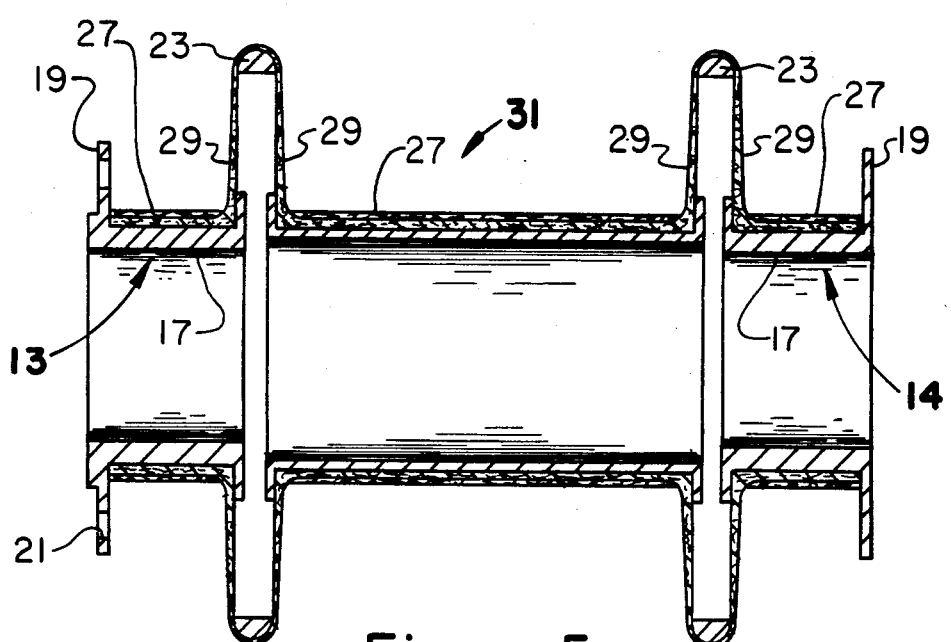
FIG. 5 is a cross sectional view showing a pair of couplings in accordance with the present invention connected by a shaft in a continuous wrapping operation.

Referring now to FIG. 5, a pair of couplings 11 of the type essentially identical to that described above and shown in FIGS. 1 and 2A, are connected by a drive shaft 31 formed in a continuous winding operation. Drive shaft 31 may be formed of a rigid cylindrical-shaped material or as an elongated extension of the hub shafts 17 of couplings 11, in which case filaments 27 coated or impregnated with the same flexible matrix material (urethane or natural rubber) as that utilized for the couplings 11 are wound directly from the couplings 11 to drive shaft 31. The rigid cylinder or elongated hub shafts 17 act as a reinforcing liner for drive shaft 31 to provide the necessary torque carrying capability. In the alternative, a removable mandrel (not shown) is disposed between coupling 11, and filaments 27 coated with a relatively stiff matrix material such as epoxy are wrapped therealong. In this case, the rigidity and torque carrying capability of the filaments 27 coated with epoxy to form drive shaft 31 is sufficient to avoid the use of a reinforcing liner, but the filaments 27 forming diaphragms 29 of couplings 11 are still impregnated with a flexible matrix material to retain the desired axial and angular misalignment accommodation capability.

It is contemplated that the coupling-shaft-coupling configuration of FIG. 5 in which all of the filaments 27 are coated or impregnated with a flexible matrix material and a reinforcing liner is used to rigidify drive shaft 31, may be easier and less costly to manufacture than the alternate configuration. However the coupling-shaft-coupling configuration in which a flexible matrix is used to impregnate the coupling filaments and a rigid matrix is used to impregnate or coat the drive shaft filaments, will provide a lighter combination which may be required in other types of applications.

Figure 6:
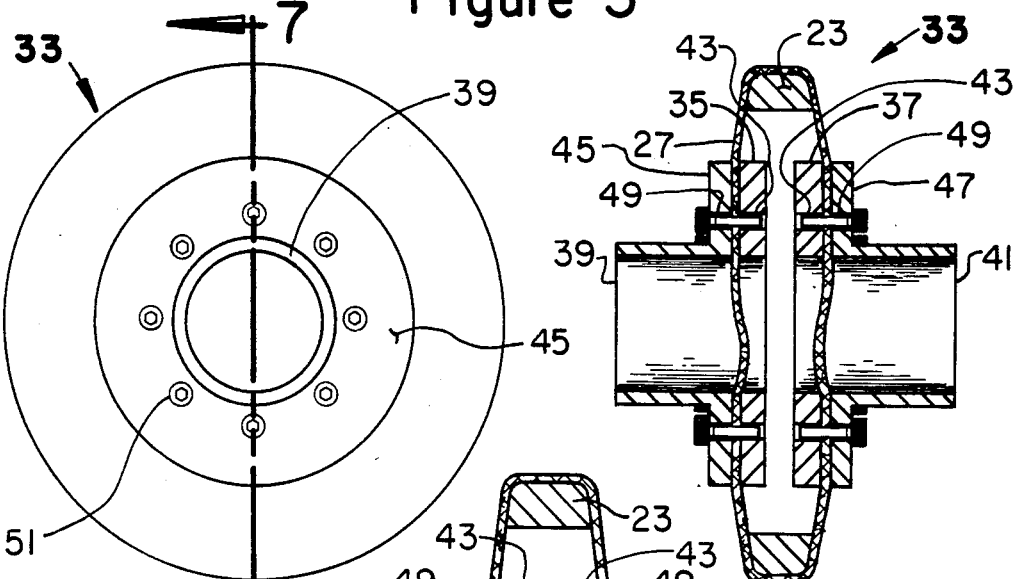
FIG. 6 is a front view of an alternate embodiment of the coupling herein.

The concept of wrapping a continuous fiber along a geodesic path from a point tangent to the shaft 17 of hub 13, over a reinforcing ring 23 and then to a corresponding point on hub 14, may be extended to a second embodiment of the subject invention in which a coupling 33 is formed with a pair of inner plates 35 and 37 separated by a removable mandrel (not shown) about which a reinforcing ring 23 is circumferentially disposed as shown in FIG. 6. In this embodiment, the filaments 27 are wrapped from a point tangent to the central bore 39 of inner plate 35 across the surface thereof to and across the reinforcing ring 23, and then to a corresponding point tangent to the central bore 41 of inner plate 37 in a geodesic path. The wrapping procedure for coupling 33 is the same as that for coupling 11 discussed above, except that no shaft entensions 17 are attached to inner plates 35 and 37 and the filaments 27 are laid down directly on the surface thereof.

Figure 7:
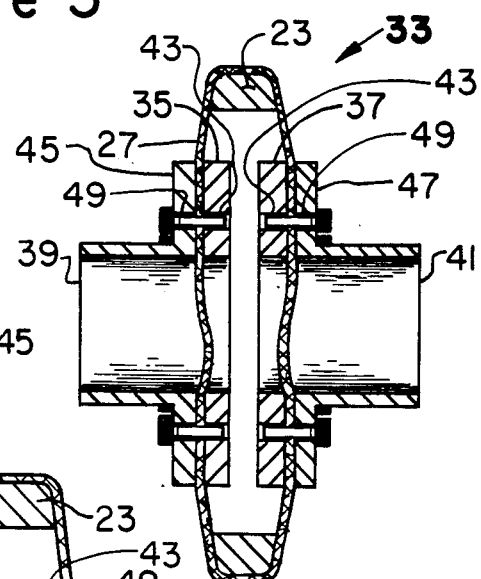
FIG. 7 is a cross sectional view taken generally along line 7—7 of FIG. 6, showing an embodiment of the fiber anchoring means of the present invention.

As discussed above, anchoring means must be provided for filaments 27 to resist slippage under load and avoid unwanted torsional softness. Without the nonaxisymmetric shaft extensions 17 which provide anchoring means in coupling 11, alternate means of anchoring filaments 27 are provided in coupling 33 as shown in FIGS. 6-9. In FIG. 7, inner plates 35 and 37 are stamped or otherwise formed in a wave-like configuration, and include a plurality of bores 43 drilled or punched at spaced intervals at a given radius from the centers thereof. A pair of correspondingly shaped outer plates 45 and 47, formed to engage inner plates 35 and 37 respectively, are also provided and include a plurality of bores 49 corresponding to bores 43 of inner plates 35 and 37. Once the inner plates 35 and 37 are covered with filaments 27 upon completion of the wrapping procedure, outer plates 45 and 47 are securely attached to the inner plates 35 and 37 respectively by tightening bolts 51 inserted through the aligning bores 43 and 49. The filaments 27 are tightly pressed between the inner and outer plates on both sides of coupling 33 and tend to assume the wave-like shape of their surfaces. This provides a secure anchorage of filaments 27 under torque loads.

Figure 8:
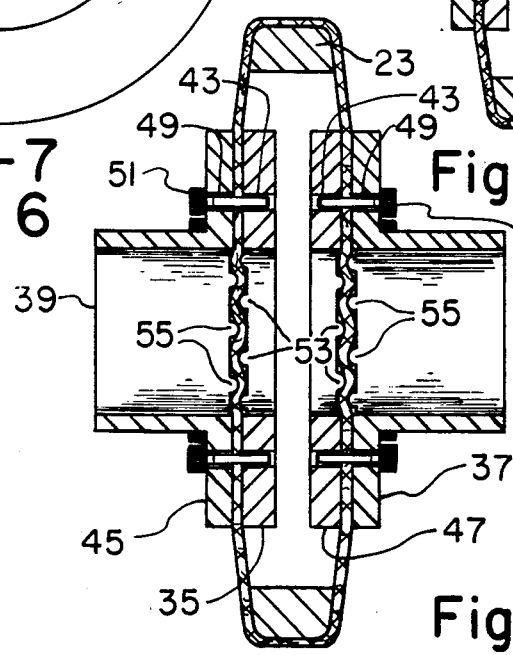
FIG. 8 is a cross sectional view of an alternate type of fiber anchoring means for the embodiment of the subject invention shown in FIG. 6.

The same effect described above may be achieved with an alternate configuration of inner plates 35 and 37 and outer plates 45 and 47 as shown in FIG. 8. In this embodiment, a series of raised sections 53 are disposed at spaced intervals about the surfaces of inner plates 35 and 37 over which filaments 27 are wrapped. Correspondingly shaped raised sections 55, formed on outer plates 45 and 47, are positioned such that upon bolting the plates together the raised sections 53 of inner plates 35 and 37 interlock with the raised sections 55 of outer plates 45 and 47. The alternating raised sections 53 and 55 force filaments 27 to assume a wave-like configuration, as in FIG. 7, and securely anchor them in position.

Figure 9:
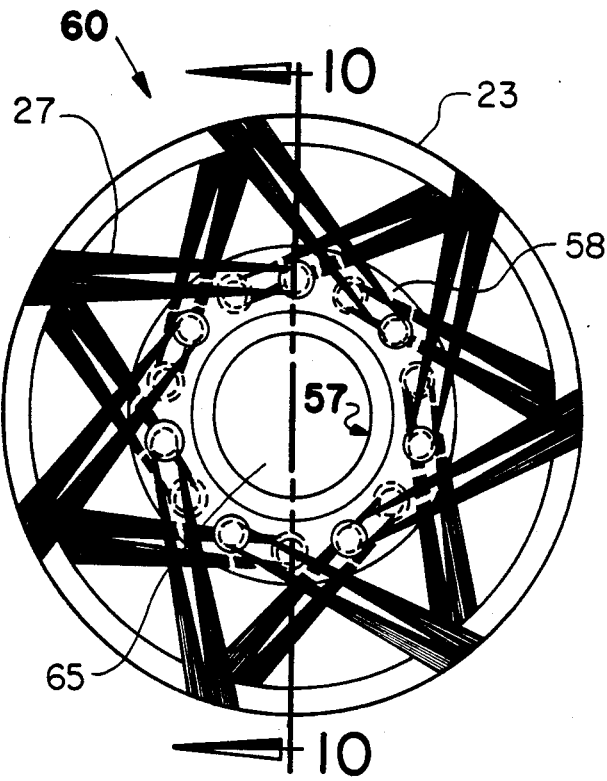
FIG. 9 is a front view of another embodiment of the coupling herein with a still further type of fiber anchoring means.
Figure 10:
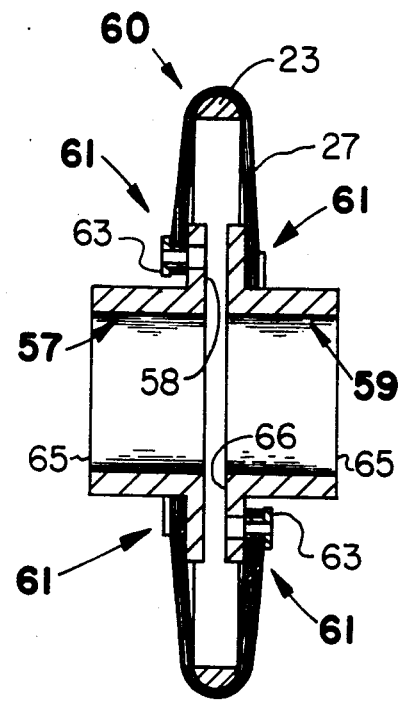
FIG. 10 is a cross sectional view taken generally along line 10—10 of FIG. 9.
Figure 11:
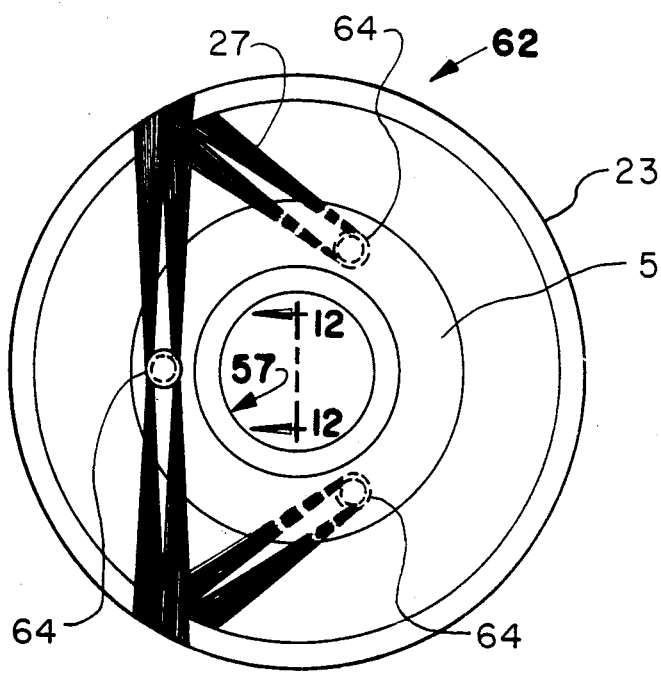
FIG. 11 is a front view of still another embodiment of the coupling herein.
Figure 12:
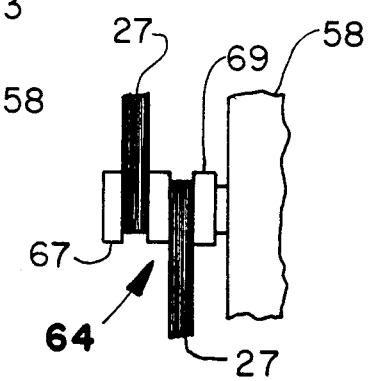
FIG. 12 is a cross sectional view taken generally along line 12—12 of FIG. 11.

Referring now to FIGS. 9-12, a third embodiment of the present invention is shown wherein still further means of anchoring filaments 27 to avoid slippage is provided. A pair of hubs 57 and 59, each having an inwardly facing flange 58 and 66 respectively, are spaced apart by a removable mandrel (not shown) about which a reinforcing ring 23 of larger diameter is circumferentially disposed. In FIG. 10, hubs 57 and 59 include seven pins 61 each having an outwardly extending flange 63, which are disposed at selected intervals on the surface of flanges 58 and 66 respectively at a constant radius from the central bore 65 of hubs 57 and 59. Filaments 27 are wrapped from a pin 61 of hub 57, to and across the surface of reinforcing ring 23 and then to a corresponding pin 61 of hub 59 following the geodesic path to form a coupling labeled with the reference 60. The winding is continued between the same two pins 61 of hubs 57 and 59 until enough filaments 27 are laid down to obtain the desired torsional strength, at which time the winding is transferred to a second set of two pins 61 and so on. Anchoring of the filaments 27 to pins 61 is accomplished by the pin flanges 63 which prevent outward radial or lateral movement.

The coupling 60 of FIGS. 9 and 10 is exceedingly light in weight and exhibits high torsional stiffness and strength in the direction of winding of filaments 27. It should be understood that the use of fourteen pins 61 in coupling 60 is not critical and may be varied as desired. By wrapping filaments 27 about pins 61 in one direction, high torsional stiffness and strength are obtained only in that direction. This may be entirely satisfactory in many applications. However, in applications where torsional strength is required for both clockwise and counter-clockwise rotation, the coupling 60 would not be appropriate since filaments 27 would tend to unwind in one direction of rotation.

To avoid this limitation, the coupling 60 of FIGS. 9 and 10 may be modified by replacing the flanged pins 61 with pins 64 having an outer spool 67 and an inner spool 69 to permit winding of filaments 27 in opposite directions from a single pin 64. In this embodiment of the subject invention, shown in FIGS. 11 and 12, a modified coupling 62 is formed by continuously wrapping a set of three pins 64; one pin 64 being located on the flange 58 of hub 57 and the other two pins being disposed at selected locations on the flange 60 of hub 59. The filaments 27 are first wound along the geodesic path from the inner spool 69 of pin 64 on hub 57 to the inner spool 69 of pin 64 on hub 59 until the desired torsional strength is obtained. The filaments 27 are then wound from the outer spool 67 of pin 64 on hub 57 to the corresponding outer spool 67 of the second pin 64 on hub 59, until the desired torsional strength in the reverse direction is obtained. The modified coupling 62 wrapped in this manner is also relatively light in weight with the added capability of accommodating torsional loads in opposite directions. Moreover, the number of filaments 27 need not be the same in both directions where it is contemplated that the torsional loads in each direction will be different.

Several improvements of the couplings herein over the prior art should be noted. The continuous fiber is wrapped directly from one hub or plate to and across a reinforcing ring and then to the other hub or plate along the shortest possible or geodesic path. Since the hubs or plates are spaced apart, all of the torque applied to the couplings is transmitted through the fiber and resisted by the relatively high tensile strength and modulus of the fiber. The various anchoring means described above assure that the fiber remains in place under expected operating torque. Once the wrapping procedure is completed and the mandrel removed, the cured filaments impregnated or coated with a flexible matrix such as natural rubber of urethane display a high degree of flexibility in the angular and axial modes. The result is a light weight coupling capable of transmitting high torque loads while retaining sufficient flexibility to accommodate relatively high degrees of angular and axial misalignment between the shafts to be joined.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A coupling having a longitudinal axis for transmitting torque and accommodating misalignment between a drive member and a driven member comprising:
   at least one rigid reinforcing ring encircling said axis;
   a pair of hubs spaced apart along said longitudinal axis and being disposed on opposite sides of and in concentric relationship with said reinforcing ring, one of said hubs being attachable to said drive member and the other of said hubs being attachable to said driven member;
   a plurality of pin elements fixedly mounted upon and projecting from each of said hubs, the direction of projection of said pin elements upon each of said hubs being away from the other of said hubs;
   a plurality of filaments individually coated or impregnated with a matrix material, said filaments being wrapped in a plurality of wrapping circuits to form connecting means between said hubs, said filaments in each of said wrapping circuits following a geodesic path and being wrapped between an associated pair of said pin elements, one pin element of each said pair being disposed upon said one of said hubs and the other pin element being disposed upon said other of said hubs, said filaments within each of said circuits being wrapped about said one pin element of said associated pair and extending to and across said reinforcing ring and then being wrapped about said other pin element of said pair;
   each of said pin elements having anchoring means integral therewith for preventing displacement therefrom of filaments wrapped thereabout;
   whereby torque applied to said coupling is transmitted from said one of said hubs through said connecting means to said other of said hubs without significant slippage.

2. A coupling as in claim 1, wherein said anchoring means includes a flange projecting outwardly from the main body of each of said pin elements.

3. A coupling as in claim 1, wherein at least one of said pin elements has a pair of filament receiving portions at spaced locations along the length thereof, one of said filament receiving portions receiving thereon filamentary material of one of said circuits and the other of said filament receiving portions receiving thereon filaments of another of said circuits, said anchoring means of said one of said pin elements including flanges respectively overlying and radially outwardly from said filament receiving portions.

* * * * *